United States Patent
Boughton et al.

(10) Patent No.: US 7,694,771 B2
(45) Date of Patent: Apr. 13, 2010

(54) VEHICLE ENGINE-MOUNT

(75) Inventors: John R. Boughton, White Lake, MI (US); David W. Skilton, Farmington Hills, MI (US); Cynthia L. Compton, Dearborn, MI (US); Alan McGowan, Wixom, MI (US); Richard T Onesti, Madison Heights, MI (US); Muhammad Younus, Rochester Hills, MI (US); Aiman Albsharat, Dearborn, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 175 days.

(21) Appl. No.: 12/019,856

(22) Filed: Jan. 25, 2008

(65) Prior Publication Data

US 2009/0188739 A1     Jul. 30, 2009

(51) Int. Cl.
*B60K 5/12* (2006.01)
(52) U.S. Cl. ........................................ 180/232; 312/299
(58) Field of Classification Search ................. 180/312, 180/232, 299, 300
See application file for complete search history.

(56) References Cited

U.S. PATENT DOCUMENTS

| 7,213,671 | B2* | 5/2007 | Hirayu ........................ 180/291 |
| 7,393,016 | B2* | 7/2008 | Mitsui et al. ................. 280/784 |
| 2006/0157292 | A1* | 7/2006 | Miyagawa et al. ........... 180/312 |
| 2007/0000713 | A1* | 1/2007 | Mir et al. ..................... 180/300 |
| 2008/0054536 | A1* | 3/2008 | Lamb ............................. 267/2 |

* cited by examiner

*Primary Examiner*—Ruth Ilan
(74) *Attorney, Agent, or Firm*—Ralph E. Smith

(57) ABSTRACT

An engine mounting device for a motor vehicle having a casing attached to the engine, a flexible annular cylinder disposed inside the casing with a longitudinal axis generally parallel to the longitudinal axis of the vehicle body, a shaft attached to the vehicle body and disposed within the annulus of the flexible cylinder, whereby the casing and the flexible annular can move along the shaft in response to a frontal impact on the vehicle, and a retainer mounted on the shaft and arranged to prevent movement of the casing along the shaft below a predetermined threshold force on the casing.

12 Claims, 8 Drawing Sheets

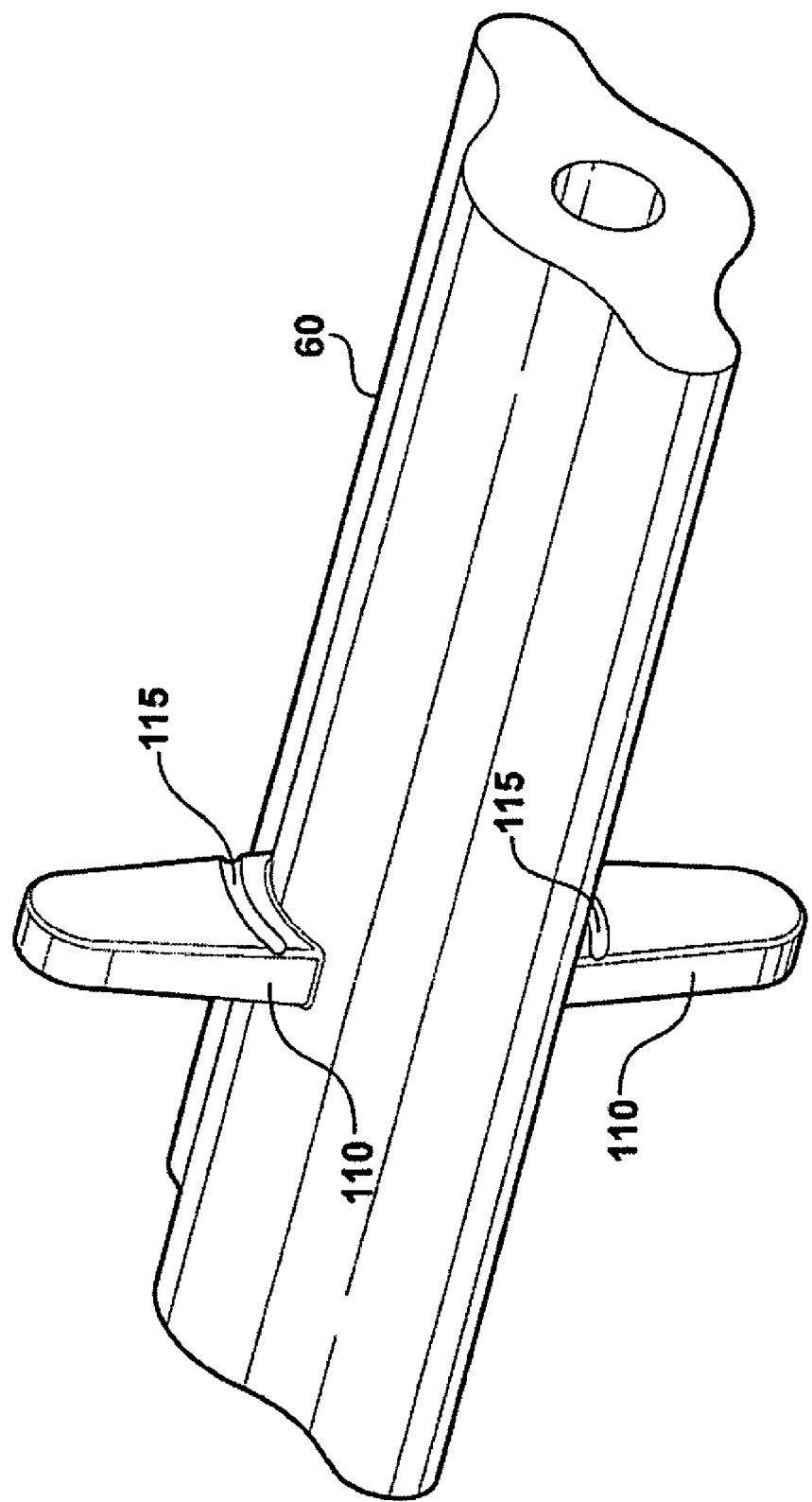

VEHICLE ENGINE-MOUNT

FIELD OF THE INVENTION

The present invention relates to an engine-mount, and, more particularly, to an engine mounting device for a vehicle having a low velocity impact isolator and retainer that will remain intact at low frontal impact loads.

BACKGROUND OF THE INVENTION

A motor vehicle is typically equipped with an engine mounting system to support the vehicle's engine on the body and to reduce transmission of engine vibrations to the passenger compartment. For effective reduction of engine vibrations a mount assembly is generally constructed from a rubber isolator sandwiched between a frame-mounted bracket and an engine-mounted bracket.

A vehicle engine has appreciable mass and inertia such that a frontal impact of sufficient intensity can cause the engine to move forward on its engine-mounts. If the impact force is sufficiently great, the mount components could disengage and fail. In cases where an engine is prevented by the mounting system from moving forward, a sufficiently high frontal impact load may drive the engine into the vehicle's passenger compartment. To prevent this, some engine-mounts are designed to disengage from the vehicle body and allow an engine to move forward in the vehicle, without regard to the force of the impact. Nevertheless, having an engine come off its mounts during a low-energy, i.e. low load, frontal impact, where the actual forces are insufficient to drive the engine into the passenger compartment, is likewise undesirable.

The present invention provides an engine-mount design for a motor vehicle that remains intact at low frontal impact loads, but also allows the engine to disengage from the vehicle body structure above a threshold frontal impact.

SUMMARY OF THE INVENTION

The present invention is an engine-mount device for supporting an engine within a compartment of a motor vehicle body. The engine-mount device has a casing for attaching to the engine, and an annular cylinder of flexible material disposed inside the casing and having a longitudinal axis generally parallel to the longitudinal axis of the vehicle body. The engine-mount device additionally has a shaft extending through the annular cylinder coincident with its longitudinal axis. The shaft has at least one frontal mounting point and one rearward mounting point for attaching to the vehicle body adjacent the engine. Said annular cylinder is thereby positioned between the frontal and rearward mounting points near the rearward mounting point, whereby the casing can move along the shaft toward the frontal mounting point in response to a frontal impact on the vehicle. The engine-mount device also includes a retainer mounted on the shaft between the casing and the shaft's frontal mounting point. The retainer is thus arranged to prevent longitudinal movement of the casing along the shaft below a predetermined threshold force on the casing responsive to a low-energy frontal impact on the motor vehicle.

The engine-mount device may have a structure arranged to collapse above the predetermined threshold force. In an alternate embodiment, the engine-mount device may have a retainer which is integral with the shaft.

It should be understood that the detailed description and specific examples which follow, while indicating preferred embodiments of the invention, are intended for purposes of illustration only and are not intended to limit the scope of the invention.

BRIEF DESCRIPTION OF THE DRAWINGS

FIG. 8 is a perspective view of a retainer formed integrally with an engine-mount shaft according to the invention.

DETAILED DESCRIPTION

In general the present invention is directed to an engine mounting device for a motor vehicle having a low velocity impact isolator and retainer that will remain intact at low frontal impact loads.

Figure 1:
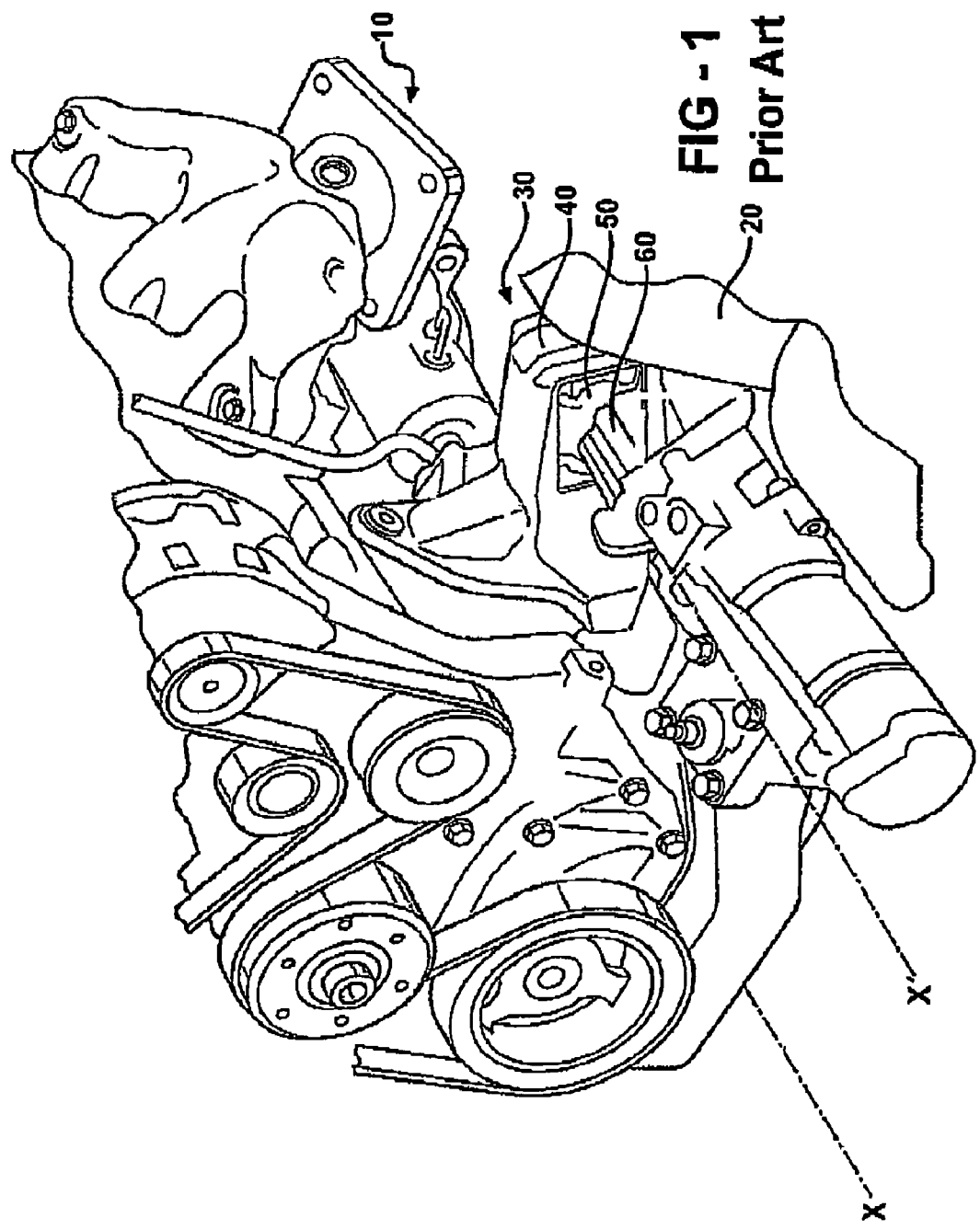
FIG. 1 is a partial perspective view of a typical engine and engine-mount assembly according to prior art.
Figure 2:
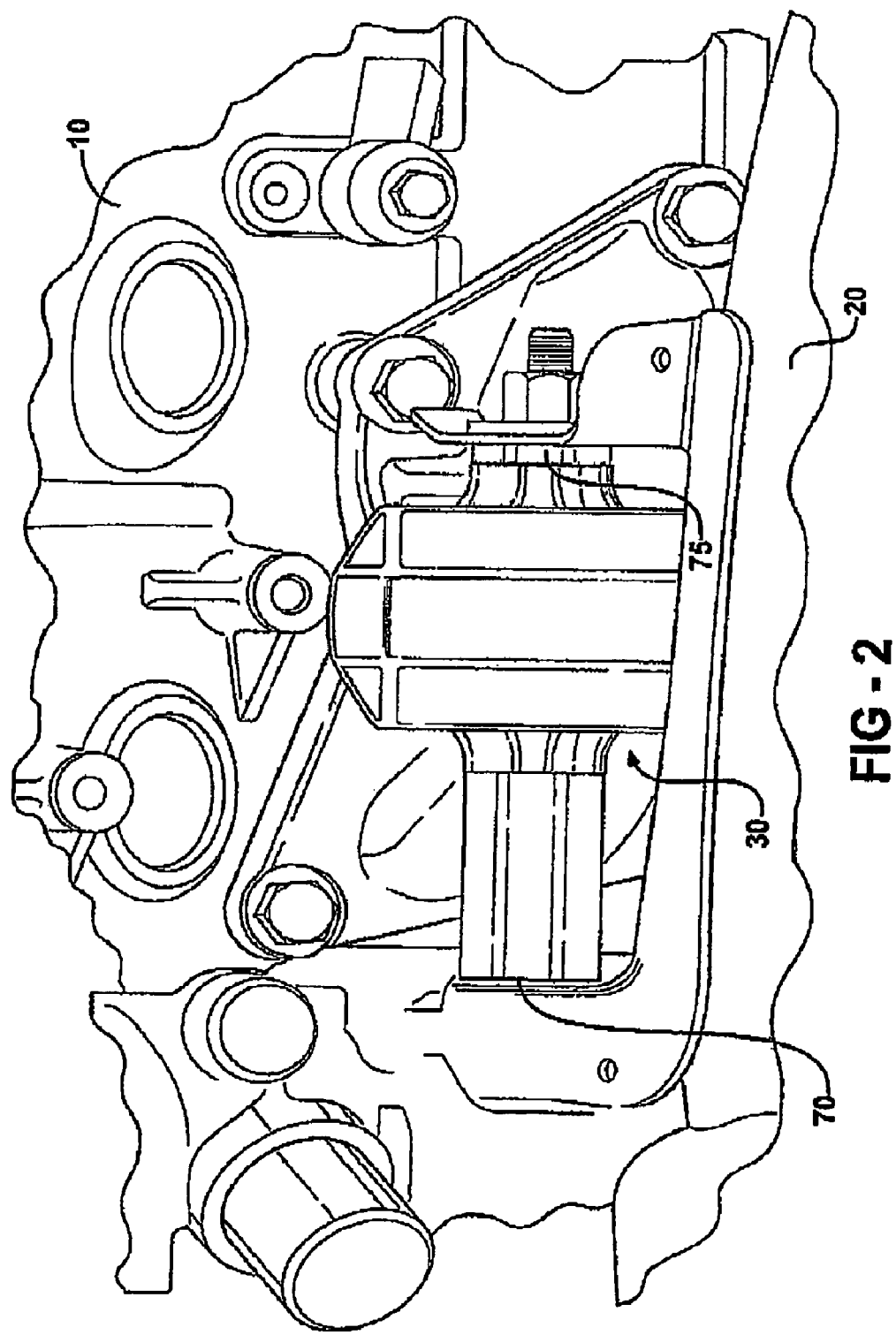
FIG. 2 is a side view of the engine-mount assembly shown in FIG. 1.

Referring now to the drawings in which like elements of the invention are identified with identical reference numerals throughout, FIGS. 1 and 2 denote a vehicle engine mounting scheme according to prior art. In such an arrangement engine 10 is attached to vehicle body 20 via mount assembly 30. Mount assembly 30 includes casing 40, which is typically constructed from a rigid high strength material such as iron, steel or aluminum. Casing 40 is attached directly to engine 10 as shown. Additionally, annular cylinder 50, made from a relatively high strength flexible material, such as an engineered rubber compound, is disposed inside casing 40 such that the annular cylinder's longitudinal axis X' is generally parallel to the longitudinal axis X of vehicle body 20 (shown in FIG. 1). Shaft 60, being typically constructed from a rigid high strength material such as steel, cast iron or aluminum, is attached directly to vehicle body 20 at frontal mounting point 70 and rearward mounting point 75. Shaft 60 is coincident with the longitudinal axis X and extends through annular cylinder 50, thereby positioning the annular cylinder between frontal mounting point 70 and rearward mounting point 75, near the rear mounting point. In the event of a sufficiently high frontal impact on vehicle body 20 engine 10 may be driven toward the front of the vehicle, whereby casing 40 would travel along shaft 60 toward frontal mounting point 70 from its position near rearward mounting point 75.

Figure 3:
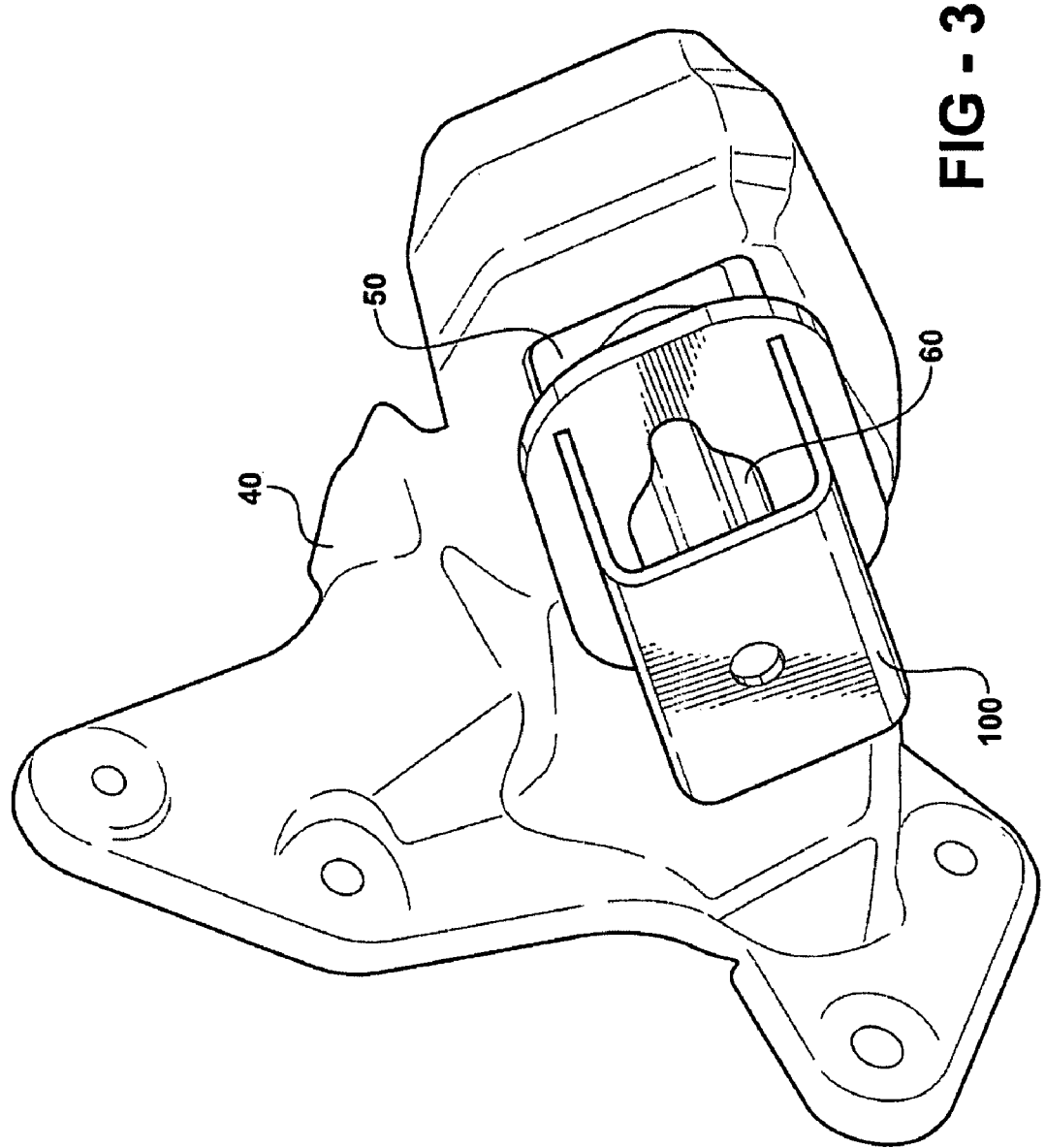
FIG. 3 is a perspective view of an impact isolator and retainer shown in relation to an engine mount according to the invention.
Figure 4:
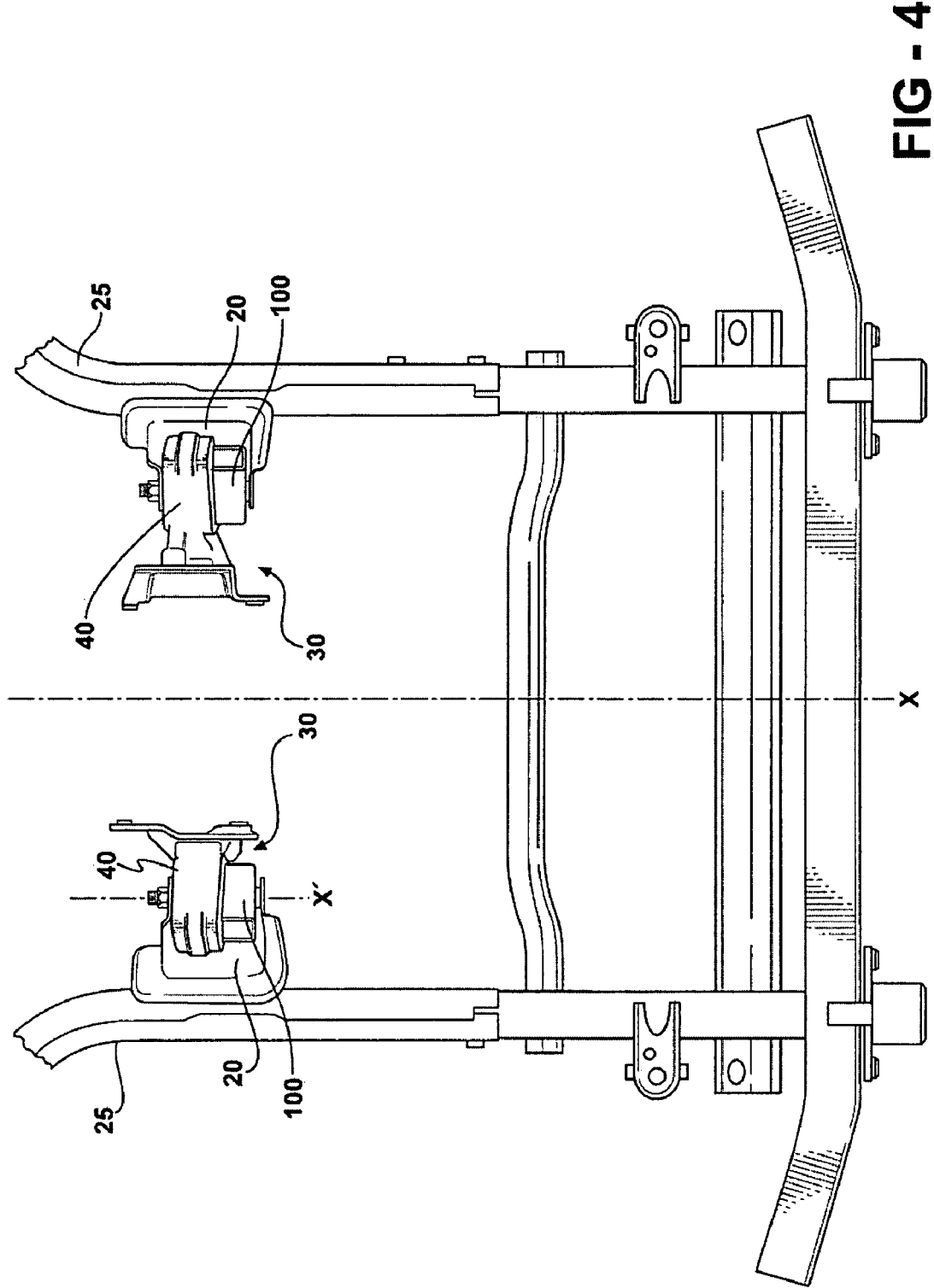
FIG. 4 is a plan view of a pair of engine-mount retainers shown in relation to engine-mount assemblies on a vehicle frame according to the invention.
Figure 5:
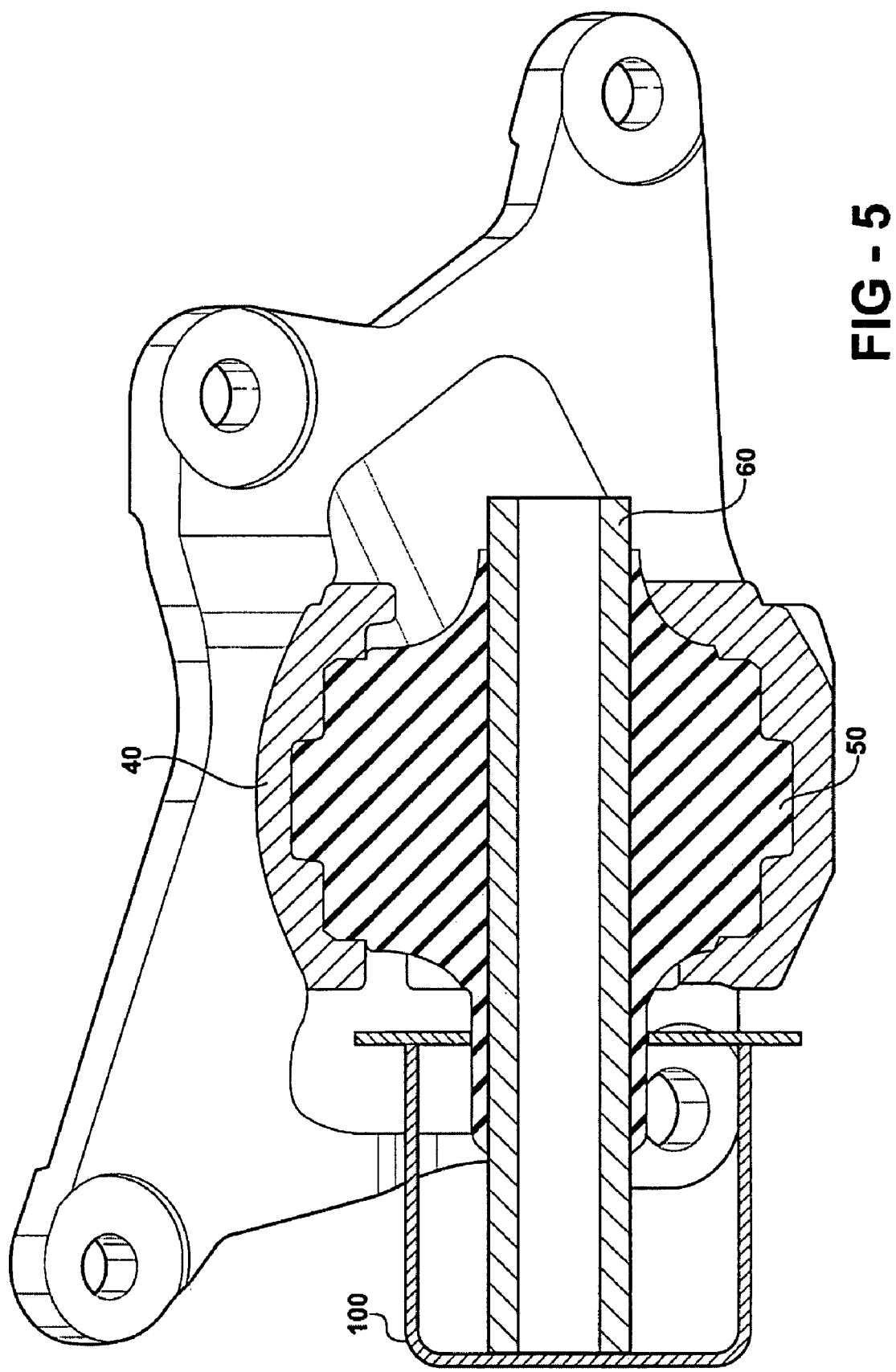
FIG. 5 is a cross-sectional view of the retainer shown in connection with an engine-mount according to the invention.

Retainer 100 according to the present invention is best seen in FIGS. 3-7. FIG. 3 denotes a perspective view of retainer 100 mounted on shaft 60 between casing 40 and frontal mounting point 70. Retainer 100 is positioned to prevent movement of casing 40 along shaft 60 under loads exerted on the casing as a result of a low energy frontal impact on vehicle body 20, e.g. in the event of a low-speed collision. A pair of retainers 100 may be mounted within a pair of mount assemblies 30 on vehicle frame 25, as shown in FIG. 4. The retainer is designed to maintain its structural integrity below a predetermined threshold force generated by a low energy frontal impact on vehicle body 20. The retainer is designed to collapse when the predetermined threshold force is met or exceeded, for example in response to a high-speed, higher load frontal impact, whereby engine 10 would be displaced toward frontal mounting point 70.

Impact loads are typically transferred differently through various vehicles' body structures. For example, an impact load which may drive a vehicle's engine into its passenger compartment depends on the design and mounting of the vehicle's power-train (engine, transmission, etc.) and its body structure. Therefore, the threshold force is preferably determined empirically during the vehicle development phase under controlled test conditions with an instrumented vehicle. Generally, a developmental vehicle is run at a test-facility to record the frontal impact energy level, i.e. speed and load, at which the vehicle's engine may shift rearward into the passenger compartment. Frontal impact energy predetermined in such fashion is used to compute the corresponding threshold force that would be placed on the retainer below which it must retain its structural integrity, and above which it must be designed to collapse.

Figure 6:
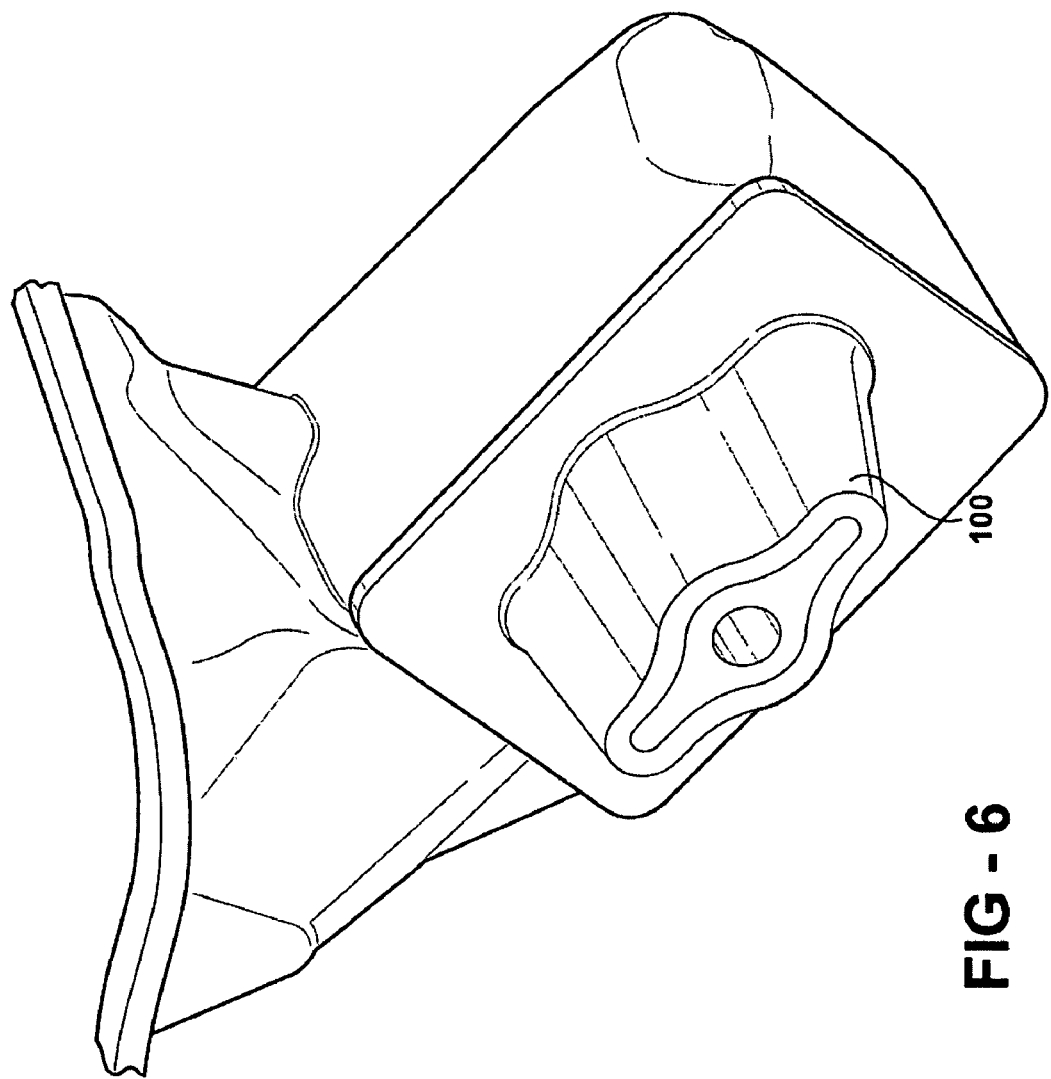
FIG. 6 is a perspective view of a first construction of a formed unitary engine-mount retainer according to the invention.
Figure 7:
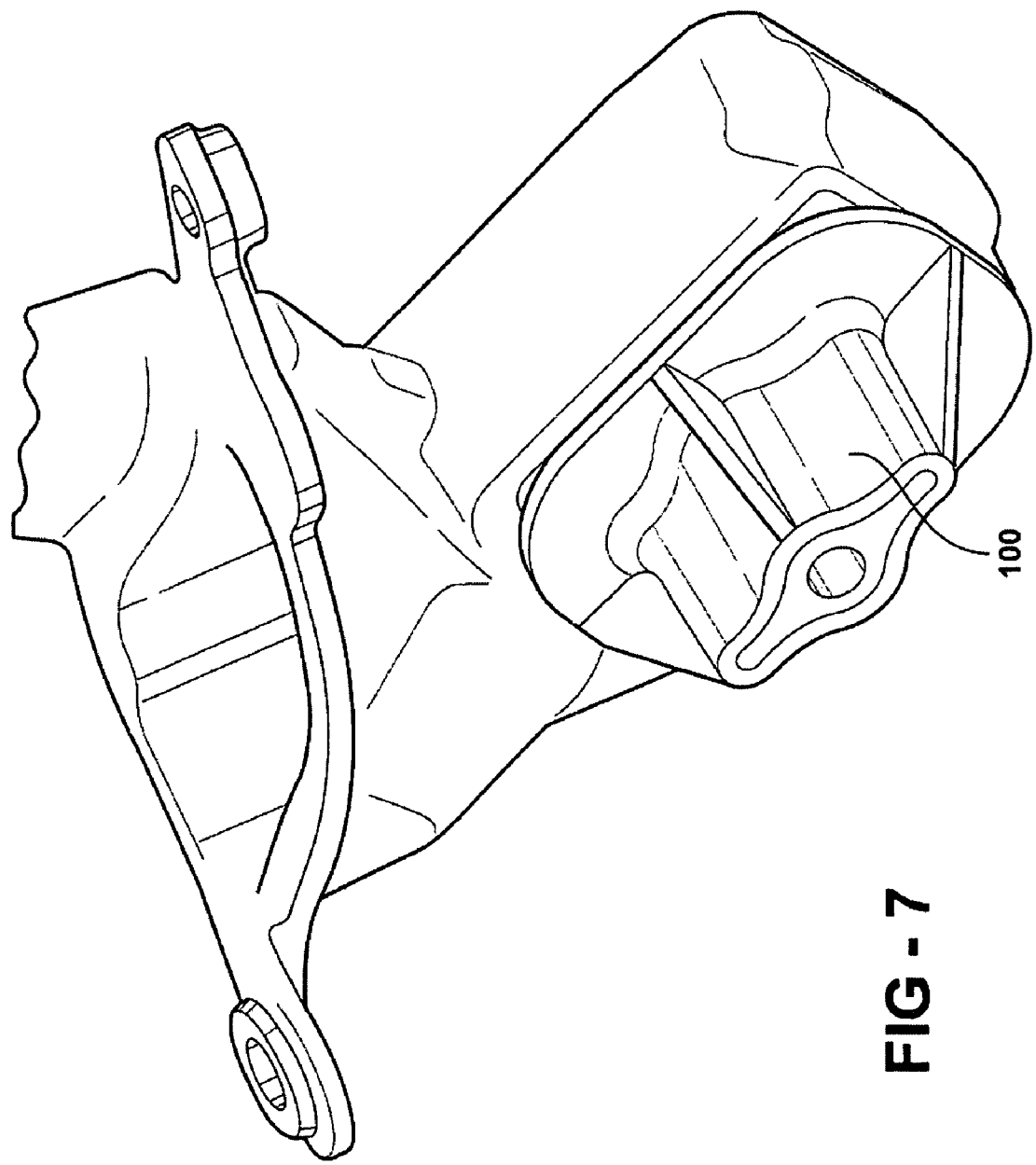
FIG. 7 is a perspective view of a second construction of a formed unitary engine-mount retainer according to the invention.

The retainer may be manufactured by a variety of methods, and the chosen manufacturing method would influence the design of the retainer and its strength. The retainer may be fabricated from a weldable material such as, for example, steel or aluminum (shown in FIG. 3), or it may comprise a unitary structure molded from an engineered plastic (as shown in FIGS. 6 and 7). The retainer may also be formed integrally with shaft 60, such as stand-off ears 110 shown in FIG. 8. Stand-off ears 110 may include depressions 115 having their depth calculated to shear the ears in response to a predetermined threshold force. Other forms of projections similarly positioned on shaft 60 between casing 40 and frontal mounting point 70 and calculated to collapse at a predetermined threshold force are also within the contemplation of the present invention. The retainer according to the present invention is useful for vehicles with various body structures, e.g. uni-body and body-on-frame vehicles.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An engine-mount device for supporting an engine within a compartment of a motor vehicle body, comprising
   i) a casing for attaching to the engine;
   ii) an annular cylinder of flexible material disposed inside the casing and having a longitudinal axis generally parallel to the longitudinal axis of the vehicle body;
   iii) a shaft extending through the annular: cylinder coincident with its longitudinal axis having at least one frontal mounting point and one rearward mounting point for attaching to the vehicle body adjacent the engine, positioning said annular cylinder near the rearward mounting point, whereby the casing can move along the shaft to the frontal mounting point; and
   iv) a retainer mounted on the shaft between the casing and the frontal mounting point, and arranged to prevent movement of the casing along the shaft below a predetermined threshold force on the casing.

2. The engine-mount device of claim 1 wherein the retainer comprises a structure arranged to collapse at the predetermined threshold force.

3. The engine-mount device of claim 2 wherein the structure is a welded steel sleeve.

4. The engine-mount device of claim 2 wherein the structure is a unitary formed sleeve.

5. The engine-mount device of claim 2 wherein the retainer is formed integrally with the shaft.

6. The engine-mount device of claim 5 wherein the retainer comprises at least one stand-off ear.

7. A motor vehicle having at least one engine-mount device for supporting an engine within a compartment of the vehicle body, the engine-mount device comprising
   i) a casing for attaching to the engine;
   ii) an annular cylinder of flexible material disposed inside the casing and having a longitudinal axis generally parallel to the longitudinal axis of the vehicle body;
   iii) a shaft extending through the annular cylinder coincident with its longitudinal axis having at least one frontal mounting point and one rearward mounting point for attaching to the vehicle body adjacent the engine, positioning said annular cylinder near the rearward mounting point, whereby the casing can move along the shaft to the frontal mounting point; and
   iv) a retainer mounted on the shaft between the casing and the frontal mounting point, and arranged to prevent movement of the casing along the shaft below a predetermined threshold force on the casing responsive to a low-energy frontal impact on the vehicle.

8. The engine-mount device of claim 7 wherein the retainer comprises a structure arranged to collapse at the predetermined threshold force.

9. The engine-mount device of claim 8 wherein the structure is a welded steel sleeve.

10. The engine-mount device of claim 8 wherein the structure is a unitary formed sleeve.

11. The engine-mount device for mounting of claim 8 wherein the retainer is formed integrally with the shaft.

12. The engine-mount device of claim 11 wherein the retainer comprises at least one stand-off ear.

* * * * *